United States Patent Office 2,947,786
Patented Aug. 2, 1960

2,947,786
SUBSTITUTED UNSATURATED ALDEHYDES

Kent C. Brannock, Kingsport, Tenn., assignor to Eastman Kodak Company, Rochester, N.Y., a corporation of New Jersey No Drawing. Filed Apr. 14, 1958, Ser. No. 728,084

8 Claims. (Cl. 260—598)

This invention relates to new alpha, alpha-dialkyl substituted unsaturated aldehydes having the structural formula

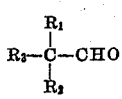

in which $R_1$ and $R_2$ are saturated alkyl groups or together form a saturated alicyclic ring and $R_3$ is an allyl group or an alkyl-substituted allyl group. These alpha, alpha-dialkyl substituted unsaturated aldehydes can be hydrogenated to the corresponding alpha,alpha-dialkyl substituted saturated alcohols, the carboxylic acid esters of which are useful as oxidation-resistant plasticizers. They can also be oxidized to the corresponding alpha, alpha-dialkyl substituted alkenoic acids, the esters of which are useful monomers for the preparation of resinous polymers.

I have found that these novel alpha,alpha-dialkyl substituted unsaturated aldehydes can be prepared by distilling, from a catalytic amount of an acidic catalyst, an acetal of an alpha,alpha-dialkyl substituted saturated aldehyde having the structural formula

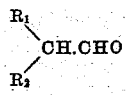

in which $R_1$ and $R_2$ have the same significance as above, with an unsaturated aliphatic alcohol $R_4OH$, in which $R_4$ is the same as $R_3$ above except that the position of the double bond may be different. The acetal has the structural formula

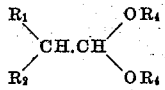

The alkenyl group derived from the unsaturated alcohol becomes attached to the alpha carbon atom of the aldehyde not through the carbon which had been attached to the oxygen, but through the carbon at the other end of the chain, with a shift in the position of the double bond. Virtually any type of acidic catalyst is satisfactory for the reaction. Mineral acids such as phosphoric acid, sulfuric acid, p-toluenesulfonic acid; boron trifluoride, calcium chloride, ammonium chloride; acidic ion exchange resins, acid clays; and strong organic acids such as formic, oxalic, trichloroacetic, and trifluoroacetic are satisfactory.

*Example 1.*—Isobutyraldehyde diallyl acetal (389.5 g.) to which 0.2 g. of 85% phosphoric acid had been added was distilled through a one-foot Vigreux column at a rate such as to maintain the still-pot temperature at 130–140° C. Over a 2½ hour period, 370 g. of distillate was collected at a head temperature of 95–117° C. The distillate was washed three times with 500-ml. portions of water to remove the allyl alcohol, which is water soluble. The remaining organic layer was distilled through an efficient column to give, after a small low-boiling forerun, 198 g. of 2,2-dimethyl-4-pentenal, B.P. 124–125° C., $n_D^{20}$ 1.4203, representing a 77% conversion based on the starting acetal. The 2,2-dimethyl-4-pentenal gave a 2,4-dinitrophenylhydrazone melting at 117–118° C.; by analysis it contained 53.1% carbon and 5.76% hydrogen; theoretical for $C_{13}H_{16}O_4N_4$ is 53.4% carbon and 5.5% hydrogen.

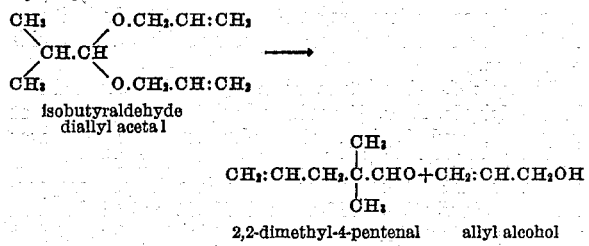

2,2-dimethyl-4-pentenal   allyl alcohol

*Example 2.*—2-Methylbutyraldehyde diallyl acetal (251 g.) to which 0.1 g. of 85% phosphoric acid had been added was distilled as in Example 1, with a pot temperature of 140–160° C., to give 242.5 g. of distillate at 96–151° C. After removal of allyl alcohol by washing with water, distillation gave 119 g. of 2-ethyl-2-methyl-4-pentenal at 150° C., $n_D^{20}$ 1.4313. Further distillation of the residue gave an additional 33 g. of the starting 2-methylbutyraldehyde diallyl acetal, B.P. 134–143° C. at 150 mm. pressure. Based on the acetal consumed, the yield of 2-ethyl-2-methyl-4-pentenal was 82%. The 2,4-dinitrophenylhydrazone of the 2-ethyl-2-methyl-4-pentenal melted at 113–114° C. and contained 54.95% carbon and 5.83% hydrogen; theoretical for $C_{14}H_{18}O_4N_4$ is 54.8% carbon and 5.88% hydrogen.

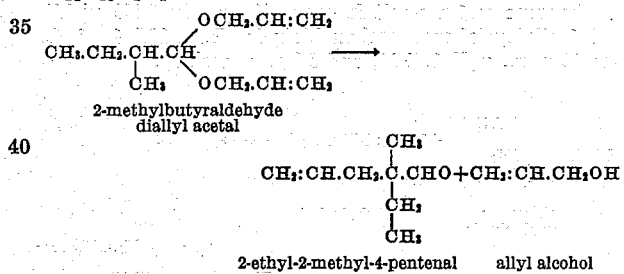

2-ethyl-2-methyl-4-pentenal   allyl alcohol

*Example 3.*—Isobutyraldehyde dimethallyl acetal (411.5 g.) to which 0.2 ml. of 85% phosphoric acid had been added was distilled through a 1-foot Vigreux column. Over a 2½ hour period, 397.5 g. of distillate was collected at 113–141° C. while the pot temperature was 149–158° C. Fractional distillation gave 146 g. of methallyl alcohol, B.P. 112–114° C., and 190.6 g. (a 73% yield) of 2,2,4-trimethyl-4-pentenal, B.P. 147.5–148° C., $n_D^{20}$ 1.4321. Analysis of the aldehyde showed 76.16% carbon and 11.30% hydrogen, as compared with calculated values of 76.2% carbon and 11.18% hydrogen. The 2,4-dinitrophenylhydrazone melted at 131–132° C.

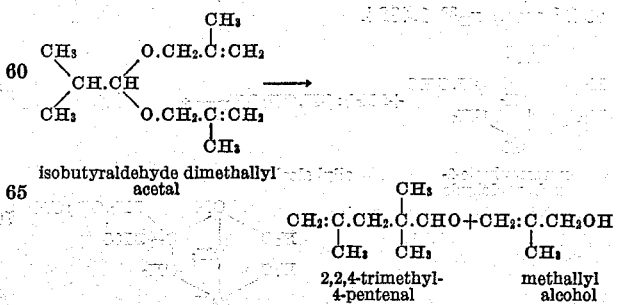

2,2,4-trimethyl-4-pentenal   methallyl alcohol

When the unsaturated alcohol is allyl alcohol or a 1-substituted and/or 3-substituted allyl alcohol, the alpha, alpha-dialkyl substituted unsaturated aldehyde may be prepared directly from the alpha,alpha-dialkyl substituted saturated aldehyde and the unsaturated aliphatic alcohol, by heating one mole of the alcohol with at least one mole of the saturated aldehyde in the presence of an acidic catalyst and a high-boiling inert solvent, under conditions such that water is removed azeotropically. This process has the advantage of not requiring recovery of the unsaturated alcohol. This one-step reaction is not applicable to 2-substituted allyl alcohols, or to 1,1- or 3,3-disubstituted allyl alcohols. 2-substituted allyl alcohols are too readily isomerized by acidic catalysts to aldehydes or ketones, and 1,1- or 3,3-disubstituted allyl alcohols undergo loss of water to give dienes with great ease.

*Example 4.*—A mixture of 108 g. (1.5 moles) of isobutyraldehyde, 58 g. (1 mole) of allyl alcohol, 200 g. of p-cymene, and 0.25 g. of p-toluenesulfonic acid was refluxed under a distillation column topped by a water separator for 32 hours. During this time the pot temperature rose slowly from 83° C. to 140° C., and 20.5 ml. of water layer (probably containing a little allyl alcohol) was separated. Fractional distillation of the reaction mixture gave 22.1 g. of isobutyraldehyde at 62–65° C., a 1.9 g. intermediate cut, and 101.1 g. (an 89% yield) of 2,2-dimethyl-4-pentenal at 124–126° C., $n_D^{20}$ 1.4200. The residue weighed 210 g. and may have contained a small amount of the diallylacetal of 2,2-dimethyl-4-pentenal.

*Example 5.*— Four hundred forty-eight grams (4 moles) of cyclohexanecarboxaldehyde, 242 g. (4.17 moles) of allyl alcohol, 60 ml. of benzene and 0.5 g. of p-toluenesulfonic acid were mixed and heated under a packed column topped by a Dean-Stark water separator for 22 hrs. During this time the pot temperature rose from 114 to 158° C. and 82 ml. of water layer (containing some dissolved allyl alcohol) was separated. Distillation of the reaction mixture gave, after removal of benzene and a small forerun, 512 g. (an 84% yield) of 1-allylcyclohexanecarboxaldehyde, B.P. 105–107° C. at 32 mm., $n_D^{20}$ 1.4701, and 56 g. of residue.

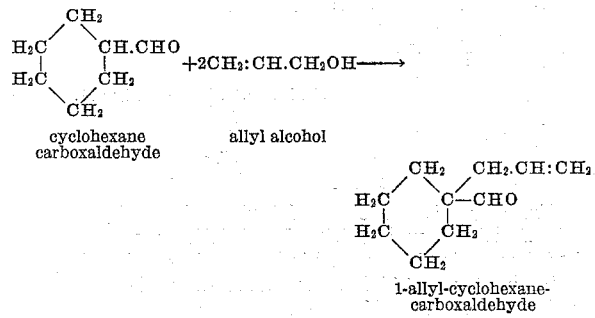

*Example 6.*—In like manner a mixture of 248 g. (2 moles) of norcamphane-2-carboxaldehyde, 121 g. (2.08 moles) of allyl alcohol, 50 ml. of benzene, and 0.2 g. of p-toluene sulfonic acid was refluxed for 25 hours, during which time 43 ml. of water layer was separated. Distillation of the reaction product gave 295 g. (a 91% yield) of 2-allyl-norcamphane-2-carboxaldehyde, B.P. 120° C. at 26 mm., $n_D^{20}$ 1.4894.

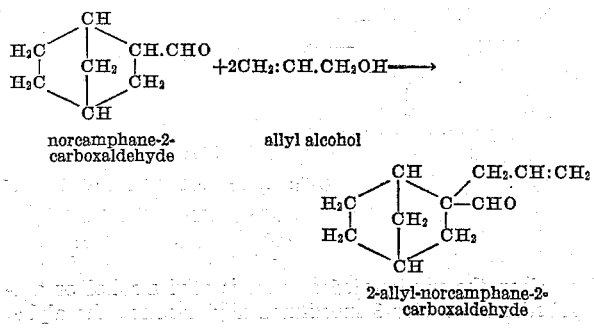

*Example 7.*—A mixture of 159 g. (2.21 moles) of isobutyraldehyde, 147 g. (1.71 moles) of 1-penten-3-ol, 0.3 g. of p-toluenesulfonic acid, and 313 g. of diphenyl ether was refluxed under a 2-ft. packed column topped by a Dean-Stark trap for 20 hours. During this time the pot temperature rose from 96° to 164° C., and 32.5 ml. of water layer was collected (theoretical 30.8 ml.). Distillation at atmospheric pressure gave 35.5 g. of recovered isobutyraldehyde (theoretical 36 g.), a 10 g. intermediate cut, and 213 g. (an 89% yield) of trans-2,2-dimethyl-4-heptenal, B.P. 167–168° C., $n_D^{20}$ 1.4320. Hydrogenation of the latter compound over Raney nickel give, in 93% yield, 2,2-dimethylheptanol, B.P. 191–192° C., $n_D^{20}$ 1.4336.

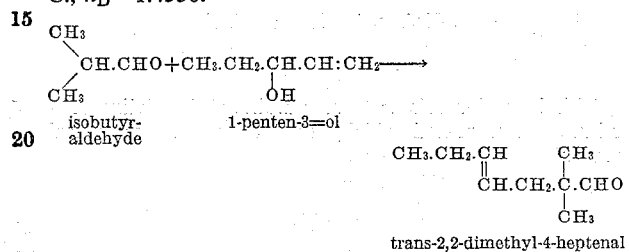

*Example 8.*—1-Allyl-cyclopentanecarboxaldehyde, B.P. 137–140° C. at 200 mm., $n_D^{20}$ 1.4622, was obtained in 72% yield from allyl alcohol and cyclopentanecarboxaldehyde using the one-step process described in Examples 3–6.

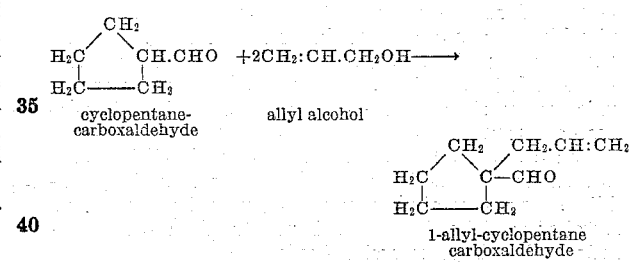

What I claim as my invention and desire to be secured by Letters Patent of the United States is:

1. A substituted unsaturated aldehyde selected from the group consisting of 2,2-dimethyl-4-pentenal; 2-ethyl-2-methyl-4-pentenal; 2,2,4-trimethyl-4-pentenal; 2,2-dimethyl-4-heptenal; 1-allyl-cyclohexane carboxaldehyde; 1-allyl-cyclopentanecarboxaldehyde; and 2-allyl-norcamphane-2-carboxaldehyde.

2. The compound 2,2-dimethyl-4-pentenal.
3. The compound 2,2,4-trimethyl-4-pentenal.
4. The compound 1-allyl-cyclohexane carboxaldehyde.
5. The compound 2-allyl-norcamphane-2-carboxaldehyde.
6. The compound of 1-allyl-cyclopentane-carboxaldehyde.

7. A process of preparing an aldehyde having the formula:

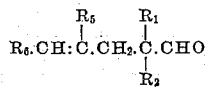

from an acetal of a saturated aldehyde having the formula

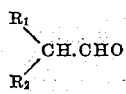

with an unsaturated aliphatic alcohol having the formula

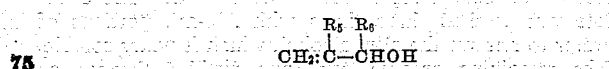

$R_1$ and $R_2$ being saturated hydrocarbon groups which together comprise from 2 to 6 carbon atoms and which may, together with the carbon atom to which they are attached, constitute an alicyclic ring, and $R_5$ and $R_6$ being each selected from the group consisting of hydrogen, methyl and ethyl, which process comprises heating the acetal in the presence of an acidic catalyst and distilling the product aldehyde from the reaction mixture.

8. A process of preparing an aldehyde having the formula

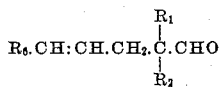

directly from an unsaturated aliphatic alcohol having the formula

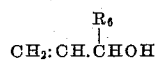

and a saturated aldehyde having the formula

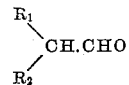

$R_1$ and $R_2$ being saturated hydrocarbon groups which together comprise from 2 to 6 carbon atoms and which may, together with the carbon atom to which they are attached, constitute an alicyclic ring, and $R_6$ being selected from the group consisting of hydrogen, methyl and ethyl, which comprises heating one mole of the alcohol with at least one mole of the saturated aldehyde in the presence of an acidic catalyst and a high-boiling inert solvent, while removing water azeotropically from the reaction mixture.

References Cited in the file of this patent
UNITED STATES PATENTS 2,501,144    Saunders _____ Mar. 21, 1950